(12) United States Patent
Deddo

(10) Patent No.: US 11,248,130 B2
(45) Date of Patent: Feb. 15, 2022

(54) VEHICLE INTERIOR PROTECTIVE COATING

(71) Applicant: ECP Incorporated, Woodridge, IL (US)

(72) Inventor: Michael Anthony Deddo, Woodridge, IL (US)

(73) Assignee: ECP Incorporated, Woodridge, IL (US)

( * ) Notice: Subject to any disclaimer, the term of this patent is extended or adjusted under 35 U.S.C. 154(b) by 86 days.

(21) Appl. No.: 16/387,685

(22) Filed: Apr. 18, 2019

(65) Prior Publication Data

US 2019/0322877 A1    Oct. 24, 2019

Related U.S. Application Data

(60) Provisional application No. 62/660,596, filed on Apr. 20, 2018.

(51) Int. Cl.
| | | |
|---|---|---|
| *C09D 5/18* | (2006.01) | |
| *C09D 127/00* | (2006.01) | |
| *C09D 7/20* | (2018.01) | |
| *C09D 5/14* | (2006.01) | |
| *C09D 7/48* | (2018.01) | |
| *C09D 127/12* | (2006.01) | |

(52) U.S. Cl.
CPC ............ *C09D 5/185* (2013.01); *C09D 5/14* (2013.01); *C09D 5/18* (2013.01); *C09D 7/20* (2018.01); *C09D 7/48* (2018.01); *C09D 127/00* (2013.01); *C09D 127/12* (2013.01)

(58) Field of Classification Search
None
See application file for complete search history.

(56) References Cited

U.S. PATENT DOCUMENTS

| | | |
|---|---|---|
| 5,217,758 A | 6/1993 | Greenleaf et al. |
| 5,782,962 A | 7/1998 | Burke et al. |
| 5,925,341 A | 7/1999 | Cervantes et al. |
| 6,013,323 A | 1/2000 | Klayder et al. |
| 6,206,956 B1 | 3/2001 | Muntz et al. |
| 6,528,580 B1 | 3/2003 | Feder et al. |
| 6,607,717 B1 | 8/2003 | Johnson et al. |
| 6,652,766 B1 | 11/2003 | Frankenbach et al. |
| 6,685,765 B1 | 2/2004 | Ghodoussi |
| 7,381,250 B2 | 6/2008 | Hasinovic et al. |
| 8,083,875 B2 | 12/2011 | Sheppard et al. |
| 8,168,578 B2 | 5/2012 | Serobian |
| 8,329,836 B2 | 12/2012 | Cavanaugh |
| 9,493,029 B2 | 11/2016 | Nachtman et al. |
| 9,493,675 B2 | 11/2016 | Nachtman et al. |
| 9,546,274 B2 | 1/2017 | Serobian et al. |
| 9,890,290 B2 | 2/2018 | Manik et al. |
| 2002/0028288 A1 | 3/2002 | Rohrbaugh et al. |
| 2004/0000013 A1 | 1/2004 | Lim |
| 2005/0250668 A1* | 11/2005 | Serobian ............... C11D 3/3738 510/466 |
| 2010/0305260 A1* | 12/2010 | Serobian ............... B05B 9/04 524/506 |
| 2016/0194503 A1 | 7/2016 | Karl |
| 2018/0142156 A1* | 5/2018 | Cha ........................ C09K 21/10 |

FOREIGN PATENT DOCUMENTS

| | | |
|---|---|---|
| CN | 106085216 A | 11/2016 |
| JP | 2011168905 A | 9/2011 |
| WO | 9841603 A1 | 9/1998 |
| WO | 2002022083 A3 | 6/2002 |

OTHER PUBLICATIONS

Aug. 7, 2019—(WO) ISR and WO—PCT/US2019/028218.
Dec. 23, 2021—(CA) OA—App. No. 3097842.

* cited by examiner

*Primary Examiner* — Robert T Butcher
(74) *Attorney, Agent, or Firm* — Banner & Witcoff, Ltd.

(57) ABSTRACT

A composition is provided comprising a high viscosity amino functional silicone fluid, a silicone glycol copolymer, an aqueous-based intumescent flame retardant, and an aqueous-based concentrated cationic fluoropolymer system that cures at ambient temperatures. The composition is characterized by providing a protective coating and enhancing the appearance of a wide variety of porous and non-porous vehicle interior material surfaces, including rubber, vinyl, fabric, carpeting, metal, metal alloys, chrome, leather, carbon fiber, aluminum, different grains of wood, dashboard tech screens, plastic made from renewable sources, and plastic made from non-renewable sources.

20 Claims, No Drawings

VEHICLE INTERIOR PROTECTIVE COATING

PRIORITY

This application is a non-provisional of U.S. patent application Ser. No. 62/660,596 entitled "Vehicle Interior Protective Coating" and filed on Apr. 20, 2018 which is incorporated by reference herein in its entirety.

FIELD OF THE INVENTION

This disclosure relates generally to a vehicle interior protective coating suitable for protecting a wide variety of surface materials in transportation vehicles.

BACKGROUND

Vehicle interiors are becoming more complex each year. Original equipment manufacturers (OEM) use many different types of materials to combine luxury with durability characteristics. Vehicle interiors may have a combination of traditional materials, such as rubber, vinyl, fabric, carpeting, metal, metal alloys, chrome and/or leathers with newer materials, such as carbon fiber, aluminum, different grains of wood, dashboard tech screens, and innovative types of plastic.

Programs are sometimes provided by vehicle manufacturers and new vehicle dealerships and/or used vehicle dealerships, wherein protective coatings are applied to interior vehicle surfaces at new vehicle dealerships and/or used vehicle dealerships. Conventional coating products, however, have disadvantages. First, conventional coating products are not suitable to protect all the different types of materials in transportation vehicles. A conventional coating product that may be suitable to protect one type of vehicle interior material may not be suitable to protect a different vehicle interior material. For example, conventional coatings designed to protect porous materials in the interior of a vehicle, e.g., fabric and carpeting materials, whether solvent-based or water-based coatings, typically leave streaks and do not suitably protect and enhance the appearance of non-porous materials in the interior of a vehicle, e.g., leather or vinyl materials. Conventional water-based coatings designed to protect non-porous in the interior of a vehicle, e.g., leather or vinyl materials, do not suitably protect or enhance the appearance of porous materials in the interior of a vehicle, e.g., fabric and carpeting materials. Thus, at least two or more coating products are needed to protect all the different types of materials in vehicle interiors. This, in turn, requires those applying protective coatings to vehicle interior materials, e.g., new vehicle dealerships and/or used vehicle dealerships, to stock a sufficient amount of these different coating products.

Second, these different coatings must typically be applied separately from one another so that each coating is applied to the respective vehicle interior material surfaces they are designed to protect and enhance the appearance thereof.

Third, the applying of these different coatings separately from one another typically requires the avoidance of applying the different coatings to vehicle interior materials for which they are not designed to protect and/or enhance the appearance thereof. This may be particularly difficult when different vehicle interior materials requiring different protective coatings are near and/or are adjacent to one another.

What are needed are more protective coating compositions and methods that do not have the limitations and disadvantages of conventional compositions and methods. It would be advantageous to have a protective coating product that is suitable for protecting and enhancing the appearance of the wide variety materials in the interiors of vehicles, including porous and non-porous materials. It would be advantageous to have a protective coating product that is a ready-to-use product, and is also user-friendly.

SUMMARY

In an aspect of the disclosure, a universal vehicle interior protective coating composition and method of application is provided to protect all surfaces in the interior of a vehicle with the exception of glass. In an aspect, the protective coating comprises a concentrated polymer water system. In an aspect, upon application to and curing of the protective coating composition on all vehicle interior surfaces, excluding glass, the protective coating composition protects those surfaces.

In an aspect, treated surfaces will repel oil, water, and dirt. In an aspect, the bonding of the polymer system is so strong that the treated surfaces will withstand numerous cleanings. In an aspect, the composition, upon application and curing on a vehicle interior surface, is characterized by providing a protective coating and enhancing the appearance of each treated vehicle interior material surface, including rubber, vinyl, fabric, carpeting, metal, metal alloys, chrome, leather, carbon fiber, aluminum, different grains of wood, dashboard tech screens, plastic made from renewable sources, and plastic made from non-renewable sources. In an aspect, the protective coating composition comprises a U.V. molecular compound, which protects against cracking and fading. In an aspect, the protective coating provides a flame retardant.

In an aspect, the coating composition comprises a high viscosity amino functional silicone fluid, a silicone glycol copolymer, an aqueous-based intumescent flame retardant, and an aqueous-based concentrated cationic fluoropolymer system that cures at ambient temperatures.

In an aspect, the coating composition may be applied to interior vehicle surfaces, excluding interior glass. In an embodiment, the interior vehicle surfaces are cleaned and/or vacuumed before applying the coating composition. In an aspect, for treatment of porous surfaces (e.g., fabric upholstery and carpeting), the coating composition is preferably sprayed in a criss cross pattern to ensure even coverage. In an aspect, for treatment of hard surfaces (e.g., leather and vinyl), the coating composition may be sprayed onto the surfaces and lightly buffed dry with a clean microfiber towel. In an aspect, for the dashboard, the coating composition may be sprayed onto a high quality microfiber towel and wiped directly onto the surface, followed by buffing of excess with a dry microfiber towel.

The above and other aspects, features and advantages of the present disclosure will be apparent from the following detailed description, including various embodiments thereof.

DETAILED DESCRIPTION

In an aspect, the coating composition comprises high viscosity amino functional silicone fluid for imparting high gloss on a substrate (e.g., APS-ME355, provided by Advanced Polymer, Inc., of Carlstadt, N.J.), a silicone glycol copolymer (e.g., APS-442, provided by Advanced Polymer, Inc., of Carlstadt, NJ), an aqueous-based intumescent flame retardant (e.g., Intumax FR-WC, provided by Broadview Technologies Inc., of Newark, N.J.), and an aqueous-based concentrated cationic fluoropolymer system that cures at ambient temperatures (e.g., FS-7520™, provided by Fiber-Shield Industries, Inc.).

In an aspect, the coating composition may be applied to interior vehicle surfaces, excluding interior glass. In an embodiment, the interior vehicle surfaces a cleaned and/or vacuumed before applying the coating composition. In an aspect, for porous surfaces (e.g., carpeting and fabric upholstery), the coating composition is preferably sprayed in a criss cross pattern to ensure even coverage. In an aspect, for hard surfaces (e.g., leather and vinyl), the coating composition may be sprayed onto the surfaces and lightly buffed dry with a clean microfiber towel. In an aspect, for the dashboard, the coating composition may be sprayed onto a high quality microfiber towel and wiped directly onto the surface, followed by buffing of excess with a dry microfiber towel. This prevents any product from getting onto the windshield. The coating composition may be applied with any suitable spray apparatus, including but not limited to the following examples:

1. A spray apparatus comprising a rotatable rotor, e.g., as disclosed in U.S. Pat. No. 9,475,071. See also the TORNADOR® product (provided by Dehn's Innovations, LLC of Dallas, Tex.)—Use tool in a well ventilated area. Add product to fill line. Adjust air supply pressure to 90 psi max. Turn valve up to allow product to mist out. Evenly spray all areas to be treated. Preferably, do not oversaturate surfaces. Wear appropriate personal protection equipment (P.P.E.) to prevent health hazards from inhalation of fine mist.

2. Pump up Sprayer—Add the coating composition product to fill line. Pump the sprayer 20 times to build pressure inside of container. Adjust spray pattern to finest setting. Use overlapping motion to ensure complete coverage. Apply product per directions above. Use pump sprayer as needed to maintain a consistent spray pattern and output.

3. Trigger bottle spray apparatus—Add the coating composition product to fill line. Adjust spray pattern to finest setting. Hold trigger 6-8 inches from surface during application. Use overlapping motion to ensure complete coverage.

The coating composition may further comprise additional components, e.g., a fragrance, dye, an antimicrobial agent or microbiocide, and/or UV protective materials. In an embodiment, the composition comprises a UV blocker/absorber, e.g., 3-(2H-Benzotriazol-2-yl)-5-(1,1-dimethyl ethyl)-4-hydroxybenzenepropanoic acid, C7-9-branched alkyl esters (Tinuvin® 99, provided by BASF Dispersions & Pigments Division). In an embodiment, the composition comprises a liquid hindered amine light stabilizer, e.g., a stabilizer comprising Bis(1,2,2,6,6-pentamethyl-4-piperidyl) sebacate, CAS No. 41556-26-7, and Methyl 1,2,2,6,6-pentamethyl-4-piperidyl sebacate, CAS No. 82919-37-7 (Tinuvin® 292, provided by Ciba Specialty Chemicals Inc., of Basel, Switzerland, which in 2009 was renamed BASF Performance Products Limited—BASF Group). In an embodiment, the composition comprises a microbiocide, e.g., a microbiocide comprising 5-chloro-2-methyl-4-isothiazolin-3-one and 2-methyl-4-isothiazolin-3-one (Acticide® RS, provided by Thor GmbH, of Speyer, Germany, and/or Thor Specialties, Inc., Turnbull, Conn.).

In some embodiments, the coating composition comprises water. In a preferred embodiment, the water is deionized water.

In a preferred embodiment, the coating composition has a formulation identified in the table below.

TABLE

| Item Ref. no. | Description | % by weight in Formulation | Lbs./100 gallons |
| --- | --- | --- | --- |
| Z99960 | Deionized water | 83.7800 | 703.762 |
| Z11130 | aqueous-based concentrated cationic fluoropolymer system that cures at ambient temperatures (FS-7520 fabric protector) | 8.0000 | 67.2000 |
| Z12250 | aqueous-based intumescent flame retardant (Intumax FR-WC) | 5.0000 | 42.000 |
| Z14680 | high viscosity amino functional silicone fluid (APS-ME355) | 1.0000 | 8.400 |
| Z22170 | isopropyl alcohol | 2.0000 | 16.800 |
| Z12240 | silicone glycol copolymer (APS-442) | 0.1000 | 0.840 |
| Z11160 | UV blocker/absorber comprising 3-(2H-Benzotriazol-2-yl)-5-(1,1-dimethyl ethyl)-4-hydroxybenzene-propanoic acid, C7-9-branched alkyl esters (Tinuvin® 99) | 0.1000 | 0.084 |
| Z11150 | liquid hindered amine light stabilizer comprising Bis(1,2,2,6,6-pentamethyl-4-piperidyl) sebacate and Methyl 1,2,2,6,6-pentamethyl-4-piperidyl sebacate (Tinuvin® 292) | 0.0100 | 0.084 |
| Z71400 | microbiocide comprising 5-chloro-2-methyl-4-isothiazolin-3-one and 2-methyl-4-isothiazolin-3-one (Acticide® RS) | 0.0100 | 0.840 |
| Totals | | 100.0000 | 840.000 |

Surprisingly, it has been found that a coating composition comprising a suitable relative amount of the high viscosity amino functional silicone fluid, the silicone glycol copolymer, the aqueous-based intumescent flame retardant, and the aqueous-based concentrated cationic fluoropolymer system that cures at ambient temperatures, protects and enhances the appearance of a wide variety of vehicle interior materials. The coatings disclosed in the present disclosure provide surprising results in that they protect and enhance the appearance of porous and non-porous materials (e.g., enhanced gloss and luster), including traditional materials, such as rubber, vinyl, fabric, carpeting, metal, metal alloys, chrome, and/or leathers, and newer materials, such as carbon fiber, aluminum, different grains of wood, dashboard tech screens, and innovative types of plastic made from renewable and/or non-renewable sources.

With the benefit of this disclosure, those skilled in the art will recognize that the percentage by weight of the above components may be modified in a manner that still protects and enhances the appearance of a wide variety of vehicle interior materials. Those skilled in the art, having the benefit of this disclosure, will recognize that the percentage by weight of the high viscosity amino functional silicone fluid, the silicone glycol copolymer, the aqueous-based intumescent flame retardant, and the aqueous-based concentrated cationic fluoropolymer system that cures at ambient temperatures, may be modified in a manner that will still protect and enhance vehicle interior materials made of traditional materials, such as rubber, vinyl, fabric, carpeting, and/or leathers, and newer materials, such as carbon fiber, aluminum, different grains of wood, dashboard tech screens, and innovative types of plastic made from renewable and/or non-renewable sources.

In an aspect of the disclosure, the coating composition is substantially devoid of volatile organic compounds (see e.g., California Code of Regulations Title 17, Article 2, Sections 94509, 94510, OTC (Ozone Transport Commission), LADCO (Lake Michigan Air Directors Consortium), and CARB's (California Air Resources Board)). In accordance with the disclosure, substantially devoid of VOCs means sufficiently devoid of VOCs to the extent that the percent of VOCs by weight in the composition is less than about 2%.

The benefits of the compositions and methods of the disclosure are unexpected in that the compositions and methods are more user-friendly than conventional compositions and methods that require use multitude of different protective coating compositions specific for different types of vehicle interior surfaces.

Those of skill in the art will recognize that in accordance with the disclosure any of the features and/or options in one embodiment or example can be combined with any of the features and/or options of another embodiment or example.

The disclosure herein has been described with reference to various embodiments, but it should be understood that the features of the disclosure are susceptible to modification, alteration, changes or substitution without departing significantly from the spirit of the disclosure. Accordingly, the specific embodiments described herein are for illustrative purposes only and the disclosure is not limited except by the following claims and their equivalents.

I claim:

1. A composition comprising:
a high viscosity amino functional silicone fluid, a silicone glycol copolymer, an aqueous-based intumescent flame retardant, and an aqueous-based concentrated cationic fluoropolymer system that cures at ambient temperatures,
wherein the composition, upon application and curing on a vehicle interior surface, is characterized by providing a protective coating and enhancing
the gloss and luster of each treated porous and non-porous vehicle interior material surface, including rubber, vinyl, fabric, carpeting, metal, metal alloys, chrome, leather, carbon fiber, aluminum, different grains of wood, dashboard tech screens, plastic made from renewable sources, and plastic made from non-renewable sources.

2. The composition of claim 1, wherein the composition further comprises deionized water.

3. The composition of claim 2, wherein the composition further comprises isopropyl alcohol.

4. The composition of claim 1, wherein the composition further comprises a liquid hindered amine light stabilizer.

5. The composition of claim 4, wherein the liquid hindered amine light stabilizer comprises Bis(1,2,2,6,6-pentamethyl-4-piperidyl) sebacate and Methyl 1,2,2,6,6-pentamethyl-4-piperidyl sebacate.

6. The composition of claim 1, wherein the composition further comprises a UV blocker/absorber.

7. The composition of claim 6, wherein the UV blocker/absorber comprises 3-(2H-Benzotriazol-2-yl)-5-(1,1-dimethyl ethyl)-4-hydroxybenzenepropanoic acid, and C7-9-branched alkyl esters.

8. The composition of claim 1 wherein the composition further comprises a microbiocide.

9. The composition of claim 8, wherein the microbiocide comprises 5-chloro-2-methyl-4-isothiazolin-3-one and 2-methyl-4-isothiazolin-3-one.

10. The composition of claim 1, wherein the composition further comprises deionized water and isopropyl alcohol.

11. The composition of claim 10, wherein the composition comprises about 1.00% by weight high viscosity amino functional silicone fluid, about 0.10% by weight silicone glycol copolymer, about 5.00% by weight aqueous-based intumescent flame retardant, about 8.00% by weight aqueous-based concentrated cationic fluoropolymer system that cures at ambient temperatures, about 83.78% by weight deionized water, and about 2.00% by weight isopropyl alcohol.

12. The composition of claim 1, wherein the composition is substantially devoid of a volatile organic compound.

13. A composition comprising:
a high viscosity amino functional silicone fluid;
a silicone glycol copolymer;
an aqueous-based intumescent flame retardant;
an aqueous-based concentrated cationic fluoropolymer system that cures at ambient temperatures;
deionized water;
isopropyl alcohol;
a liquid hindered amine light stabilizer;
a UV blocker/absorber; and
a microbiocide;
wherein the composition, upon application and curing on a vehicle interior surface, is characterized by providing a protective coating and enhancing the gloss and luster of each treated porous and non-porous vehicle interior material surface, including rubber, vinyl, fabric, carpeting, metal, metal alloys, chrome, leather, carbon fiber, aluminum, different grains of wood, dashboard tech screens, plastic made from renewable sources, and plastic made from non-renewable sources.

14. The composition of claim 13, wherein the liquid hindered amine light stabilizer comprises Bis(1,2,2,6,6-pentamethyl-4-piperidyl) sebacate and Methyl 1,2,2,6,6-pentamethyl-4-piperidyl sebacate.

15. The composition of claim 13, wherein the UV blocker/absorber comprises 3-(2H-Benzotriazol-2-yl)-5-(1,1-dimethyl ethyl)-4-hydroxybenzenepropanoic acid, and C7-9 branched alkyl esters.

16. The composition of claim 13, wherein the microbiocide comprises comprising 5-chloro-2-methyl-4-isothiazolin-3-one and 2-methyl1-4-isothiazolin-3-one.

17. The composition of claim 13, wherein the composition is substantially devoid of a volatile organic compound.

18. The composition of claim 13, wherein the composition comprises:
1% by weight high viscosity amino functional silicone fluid;
0.10% by weight silicone glycol copolymer;
5.00% by weight aqueous-based intumescent flame retardant;
8.00% by weight aqueous-based concentrated cationic fluoropolymer system that cures at ambient temperatures,
83.78% by weight deionized water,
2.00% by weight isopropyl alcohol,
0.01% by weight liquid hindered amine light stabilizer;
0.10% by weight UV blacker absorber; and
0.01% by weight microbiocide.

19. The composition of claim 18, wherein
the liquid hindered amine light stabilizer comprises Bis (1,2,2,6,6-pentamethyl-4-piperidyl) sebacate and Methyl 1,2,2,6,6-pentamethyl-4-piperidyl sebacate;
the UV blocker/absorber comprises 3-(2H-Benzotriazol-2-yl)-5-(1,1-dimethyl ethyl)-4-hydroxybenzenepropanoic acid, and C7-9-branched alkyl esters; and
the microbiocide comprises 5-chloro-2-methyl-4-isothiazolin-3-one and 2-methyl-4-isothiazolin-3-one.

20. A method comprising:
(a) applying a coating composition to both porous and non-porous vehicle interior surfaces; and
(b) allowing the coating composition to cure on both the porous and non-porous vehicle interior surfaces;

wherein the coating composition comprises a high viscosity amino functional silicone fluid, a silicone glycol copolymer, an aqueous-based intumescent flame retardant, and an aqueous-based concentrated cationic fluoropolymer system that cures at ambient temperatures;

wherein the coating composition, upon application and curing on both the porous and non-porous vehicle interior surfaces, is characterized by providing a protective coating and enhancing the appearance of each treated vehicle interior material surface, including rubber, vinyl, fabric, carpeting, metal, metal alloys, chrome, leather, carbon fiber, aluminum, different grains of wood, dashboard tech screens, plastic made from renewable sources, and plastic made from non-renewable sources.

\* \* \* \* \*

UNITED STATES PATENT AND TRADEMARK OFFICE
CERTIFICATE OF CORRECTION

| | |
|---|---|
| PATENT NO. | : 11,248,130 B2 |
| APPLICATION NO. | : 16/387685 |
| DATED | : February 15, 2022 |
| INVENTOR(S) | : Deddo |

It is certified that error appears in the above-identified patent and that said Letters Patent is hereby corrected as shown below:

In the Claims

In Claim 20 at Column 7, Line 9:
Remove "appearance"
Replace with -- gloss and luster --

Signed and Sealed this
Third Day of May, 2022

Katherine Kelly Vidal
*Director of the United States Patent and Trademark Office*